United States Patent
Gerfast

(10) Patent No.: US 6,940,238 B2
(45) Date of Patent: Sep. 6, 2005

(54) SINGLE COIL, DIRECT CURRENT PERMANENT MAGNET BRUSHLESS MOTOR WITH VOLTAGE BOOST

(75) Inventor: Sten R. Gerfast, Mendota Heights, MN (US)

(73) Assignee: McMillan Electric Company, Woodville, WI (US)

(*) Notice: Subject to any disclaimer, the term of this patent is extended or adjusted under 35 U.S.C. 154(b) by 0 days.

(21) Appl. No.: 10/991,908

(22) Filed: Nov. 18, 2004

(65) Prior Publication Data

US 2005/0122074 A1  Jun. 9, 2005

Related U.S. Application Data

(63) Continuation of application No. 10/462,008, filed on Jun. 12, 2003, now Pat. No. 6,850,019.

(51) Int. Cl.[7] .............................................. H02P 1/18
(52) U.S. Cl. ...................... 318/254; 318/138; 318/439; 318/700; 318/701; 318/724; 310/156; 310/156.48; 310/162; 310/165; 310/67 R; 310/68 B
(58) Field of Search ................................ 318/254, 138, 318/439, 700, 701, 724; 310/156, 156.48, 310/162, 165, 67 R, 68 B, 179, 180

(56) References Cited

U.S. PATENT DOCUMENTS

| 3,891,905 A | * | 6/1975 | Muller | 318/254 |
|---|---|---|---|---|
| 4,357,563 A | * | 11/1982 | Ohno | 318/254 |
| 4,379,984 A | | 4/1983 | Müller | 318/254 |
| 4,535,275 A | | 8/1985 | Müller | 318/254 |
| 4,703,212 A | * | 10/1987 | Aboukrat et al. | 310/218 |
| 4,704,567 A | * | 11/1987 | Suzuki et al. | 318/254 |
| 4,983,867 A | * | 1/1991 | Sakamoto | 310/49 R |
| 5,377,094 A | | 12/1994 | Williams et al. | 363/132 |
| 5,451,848 A | | 9/1995 | Okada et al. | 318/280 |
| 5,459,654 A | | 10/1995 | Williams et al. | 363/98 |
| 5,537,012 A | | 7/1996 | Yaguchi | 318/254 |
| 5,672,925 A | * | 9/1997 | Lipo et al. | 310/154.11 |

(Continued)

FOREIGN PATENT DOCUMENTS

JP    02-254995    10/1990

(Continued)

*Primary Examiner*—Rita Leykin
(74) *Attorney, Agent, or Firm*—Merchant & Gould P.C.

(57) ABSTRACT

A single coil, direct current permanent magnet brushless motor including a stator including six alternately-wound coils connected into a single coil having first and second ends, the oppositely-wound coils forming stator poles, and six magnets of alternating polarity coupled to a rotor and rotatably journaled in the stator. A sensor, such as a dual output Hall sensor, is used for sensing rotation of the rotor. A drive circuit, such as an H-bridge circuit, is coupled to the first and second ends of the single coil to drive the motor. The H-bridge circuit includes two high-side switches for alternately receiving signals from the Hall sensor, and two low-side switches alternately receiving signals from the Hall sensor. A high-side switching signal can be controlled by an inverted low-side switching signal. A voltage boost circuit is also provided, having capacitors to provide a boosted voltage to alternately turn on the high-side switches of the H-bridge. The capacitors can be charged by an unregulated bus voltage.

13 Claims, 5 Drawing Sheets

U.S. PATENT DOCUMENTS

| | | | |
|---|---|---|---|
| 5,703,447 A | 12/1997 | Higuchi | 318/139 |
| 5,723,931 A | 3/1998 | Andrey | 310/179 |
| 5,764,007 A | 6/1998 | Jones | 318/109 |
| 5,859,519 A | 1/1999 | Archer | 318/801 |
| 5,896,287 A | 4/1999 | Mihara et al. | 363/132 |
| 5,959,377 A | 9/1999 | Horng | 310/40 MM |
| 5,990,644 A | 11/1999 | Furuya et al. | 318/293 |
| 6,078,122 A | 6/2000 | Tang et al. | 310/165 |
| 6,124,751 A | 9/2000 | Pidutti | 327/424 |
| 6,476,526 B1 * | 11/2002 | Hsieh | 310/68 B |
| 6,572,925 B2 * | 6/2003 | Zubkov et al. | 427/255.37 |

FOREIGN PATENT DOCUMENTS

| | | | |
|---|---|---|---|
| JP | 08-162934 | | 6/1996 |
| JP | 08 162934 | * | 6/1996 |
| JP | 11-108706 | | 4/1999 |
| JP | 2000-125586 | | 4/2000 |

* cited by examiner

SINGLE COIL, DIRECT CURRENT PERMANENT MAGNET BRUSHLESS MOTOR WITH VOLTAGE BOOST

RELATED APPLICATION

This is a continuation of application Ser. No. 10/462,008, filed on Jun. 12, 2003, now U.S. Pat. No. 6,850,019 the entirety of which is hereby incorporated by reference.

TECHNICAL FIELD

This invention relates generally to direct current electric motors. More particularly, this invention relates to a single coil, direct current permanent magnet brushless motor with a voltage boost circuit.

BACKGROUND

Permanent magnet brushless electric motors are desirable for efficiency. Brushless motors are typically more efficient and quieter than induction motors because brushless motor designs avoid losses related to the "induction" process. However, the costs associated with the manufacture of brushless motors are usually greater than induction motors. For example, brushless motors can be more expensive than induction motors because of the control circuitry necessary to drive the brushless motors. Therefore, until recently, brushless motors have typically been used in larger, expensive equipment such as washing machines and high-efficiency furnaces and in medical and military applications, where cost is less of a factor.

Increased concerns for efficiency and stricter government regulations are requiring more efficient electric motors. Single-phase brushless motors are known. See, for example, U.S. Pat. Nos. 4,379,984, 4,535,275 and 5,859,519, and S. Bentouati et al., *Permanent Magnet Brushless DC Motors For Consumer Products* (last visited Dec. 8, 2002), located at URL magnet.ee.umist.ac.uk/reports/P 11/p11.html.

Although different brushless motors can vary in configuration, all brushless motors run on direct current and include circuitry to sequentially switch the direct current into one or more stator coils. In addition, most brushless motors include a plurality of permanent magnets attached to a rotor.

Brushless motors typically have a different number of stator poles versus rotor poles. For example, a majority of brushless motor manufacturers use a three phase drive circuit including three rotation sensors and six transistors to switch the direct current. Current flows through two of the three coils or phases at any one time. Therefore, a three phase motor with three coils only utilizes approximately two-thirds of the copper windings at one time. Such a configuration can provide a smooth drive and good starting torque, but is complicated in terms of the number of components and the expense of the components. Other similarly designed motors including different pairings of stator poles versus rotor poles (e.g., 6-8, 12-8, 4-6, 6-2) are also complex and expensive.

In particular, the circuitry used to drive a brushless motor can be complex and expensive. For example, some drive circuits for brushless motors require a voltage boost, or discrete isolated voltage sources. This can be accomplished, for example, using a transformer. However, transformers are both bulky and expensive. Voltage doublers can also be used, but they typically require large and expensive capacitors to generate the needed voltages with sufficient current capability. Other circuitry, such as charge pumps with a dedicated oscillator, diodes, and capacitors, has also been used.

One application in which the above-described voltage boost circuits have been used is in drive circuits for brushless motors including a main semi-conductor switch (e.g., mosfets, transistors, SCRs, Triacs, etc.) that "is above the load." This is generally the case in a drive circuit in which a full-bridge or half-bridge is used to drive the motor. Although the drive circuits noted above may be used in a drive circuit for a brushless motor with main switches that are above the load, such circuits can be inefficient, complex, and cost-prohibitive.

Accordingly, it is desirable to provide a brushless motor that is efficient and can be manufactured in a cost-effective manner.

SUMMARY

This invention relates generally to direct current electric motors. More particularly, this invention relates to a single coil, direct current permanent magnet brushless motor with a voltage boost circuit.

According to one aspect, the invention relates generally to a single coil, direct current permanent magnet brushless motor, including an internal rotor with six alternate polarity magnets rotatably journaled in the motor, and an external stator with six salient poles including six alternately wound coils coupled to form a single coil with two free ends. The motor can also include a commutated H-bridge having a voltage boost circuit with capacitors providing a boosted voltage to alternately turn on high-side switches of the H-bridge, wherein the capacitors are charged by a switching current flowing through low-side switches.

In another aspect, the motor can also be configured to be powered by either alternating current or direct current. For example, the motor can have an alternating current conversion circuit including a bridge rectifier and smoothing capacitor coupled to a source of alternating current, the conversion circuit converting the alternating current to provide direct current to power the motor.

In yet another aspect, a means for providing locked rotor protection can include a Hall sensor configured to turn off the two high-side switches and two low-side switches of the H-bridge for a period of time when the Hall sensor detects a locked rotor condition.

The above summary is not intended to describe each disclosed embodiment or every implementation of the present invention. Figures and the detailed description that follow more particularly exemplify embodiments of the invention. While certain embodiments will be illustrated and described, the invention is not limited to use in such embodiments.

BRIEF DESCRIPTION OF THE DRAWINGS

Aspects of the invention may be more completely understood in consideration of the following detailed description of various embodiments of the invention in connection with the accompanying drawings, in which.

While the invention is amenable to various modifications and alternative forms, specifics thereof have been shown by way of example and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

This invention relates generally to direct current electric motors. More particularly, this invention relates to a single coil, direct current permanent magnet brushless motor with a voltage boost circuit. While the present invention is not so limited, an appreciation of the various aspects of the invention will be gained through a discussion of the examples provided below.

Generally, the present disclosure relates to a single coil, direct current permanent magnet brushless motor including a rotor with alternate-polarity magnets rotatably journaled in the motor and a stator with a like number of stator poles including wound coils connected into a single coil with two ends. Preferably, the motor includes at least four magnets and a like number of stator poles. More preferably, the motor includes six magnets and six stator poles. In addition, the motor includes a commutated H-bridge coupled to the two ends of the single coil to drive the motor.

Figure 1:
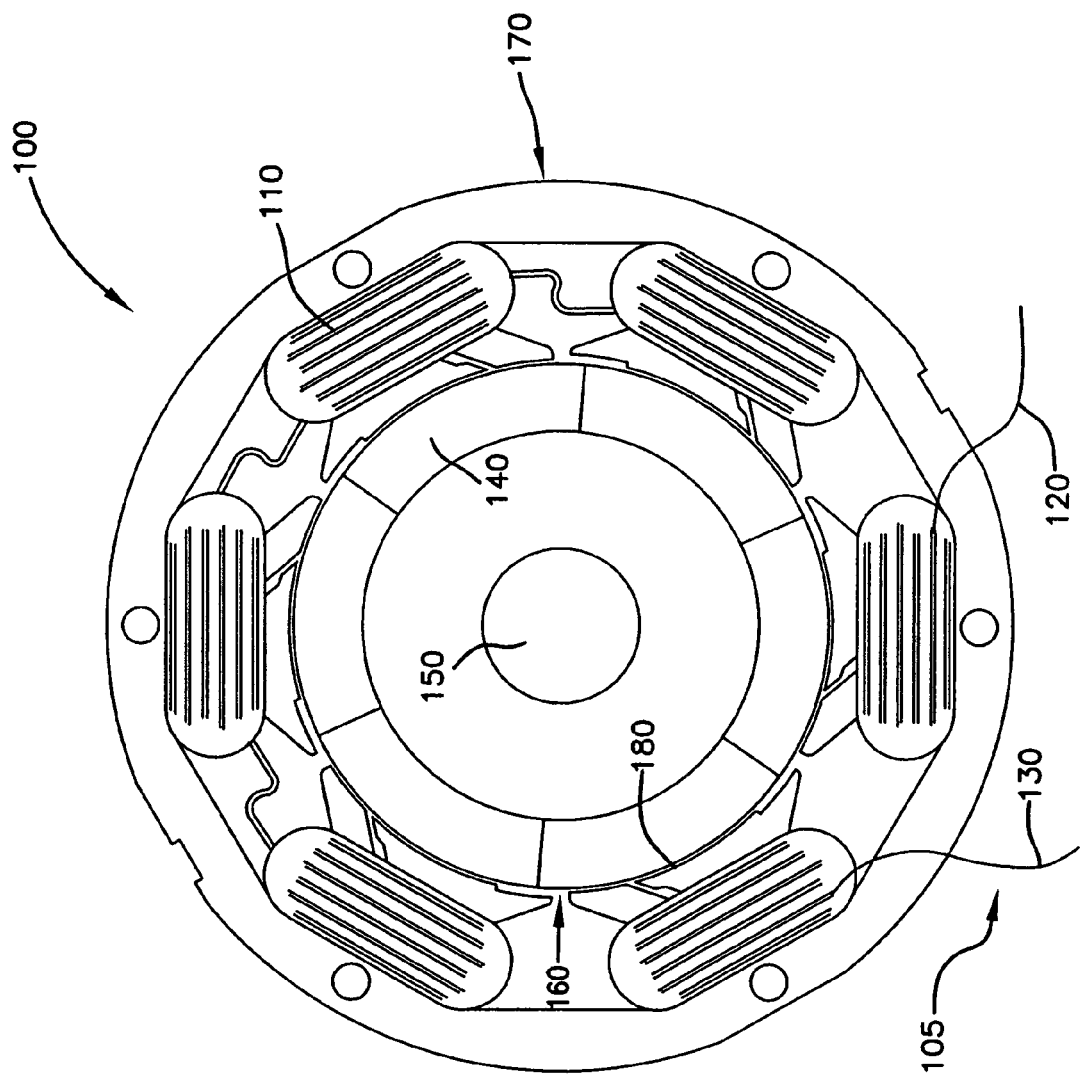
FIG. 1 is a partial cutaway view of an example single coil, direct current permanent magnet brushless electric motor.

Referring now to FIG. 1, one embodiment of a single coil, direct current permanent magnet brushless motor 100 is shown. Generally, the motor 100 includes a stationary stator 170 and a rotatable rotor 160. Preferably, an air gap 180 formed between the stator 170 and the rotor 160 is concentrically uniform, irrespective of any reluctance notches formed in the stator.

Figure 2:
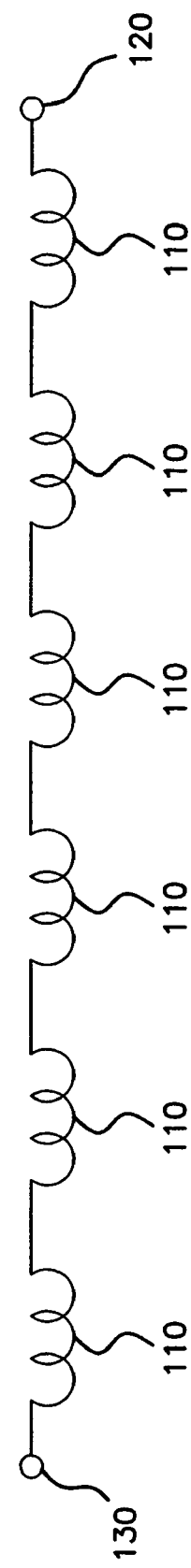
FIG. 2 is a schematic view of six coils coupled to form a single coil with two free ends.

The stator 170 includes a plurality of stator poles 110 individually wound and connected to form a single coil 105 with two free ends 120 and 130 (see FIG. 2). The single coil 105 can be formed using a variety of techniques such as, for example, a bifilar winding. Each stator pole 110 is formed by winding a coil in a given direction. Each alternating pole 110 is wound in an opposite direction and connected to the next pole to form an alternating series of north and south stator poles.

In addition, the rotor 160 of the motor 100 includes a plurality of rotor poles 140, formed by permanent magnets coupled to the rotor 160. Each alternating rotor pole 140 is of a different polarity to form an alternating series of north and south rotor poles. The illustrated rotor 160 is an internal rotor, although external or flat-type rotors can also be used.

Preferably, at least four alternating stator poles and four associated rotor poles are provided. Preferably, the brushless motor includes the same number of stator and rotor poles. Most preferably, and as illustrated, the motor 100 includes six stator poles and a like number of rotor poles.

To operate the motor 100, free ends 120 and 130 of the single coil 105 are connected to a source of electric power. Specifically, the free end 120 is connected to an electric source of positive potential, and free end 130 is connected to an electrical source of negative potential. In this configuration, electrical current flows through the single coil 105 in a forward direction, for example, from free end 120 to free end 130. As the current flows through the single coil 105, the stator poles 110 act as electromagnets of alternating north or south polarity, depending on which direction each stator pole 110 is wound.

The rotor poles 140 are attracted to each respective adjacent oppositely-charged stator pole 110, causing the rotor 160 to turn. As the current flowing through the single coil 105 is alternately switched between the forward and a reverse direction, each stator pole 110 changes polarity to attract an oppositely-charged rotor pole 140, causing the rotor 160 to continue spinning. One pulse (i.e. the change in the direction of the current through the single coil 105) is required for each pole to cause the rotor to complete a full revolution of 360 degrees. For the illustrated six-pole motor, six pulses are required to cause the rotor 160 to complete one full 360-degree revolution. As the rotor 160 spins, torque is transferred to a shaft 150 that is coupled to the rotor 160 of the motor 100.

A sensor (not shown in FIG. 1) that can be fixed on the stator, in close proximity to the permanent magnets on the rotor, is able to determine the polarity of the magnet positioned in front of it. The sensor is thereby used to provide feedback as to the angular position of the rotor 160 relative to the stator 170 to control the direction of the current (forward or reverse) applied to the first and second ends 120 and 130 of the single coil 105, thereby providing the switching necessary to cause the rotor 160 to spin.

Multiple speeds for the motor 100 can be accomplished, for example, with pulse circuits including pulse width modulation (PWM), phase control, or multiple windings, or by switching in a current limiting capacitor in an alternating current line, if the motor is driven by rectified alternating current as described in U.S. Pat. No. 4,929,871 to Gerfast.

Figure 3:
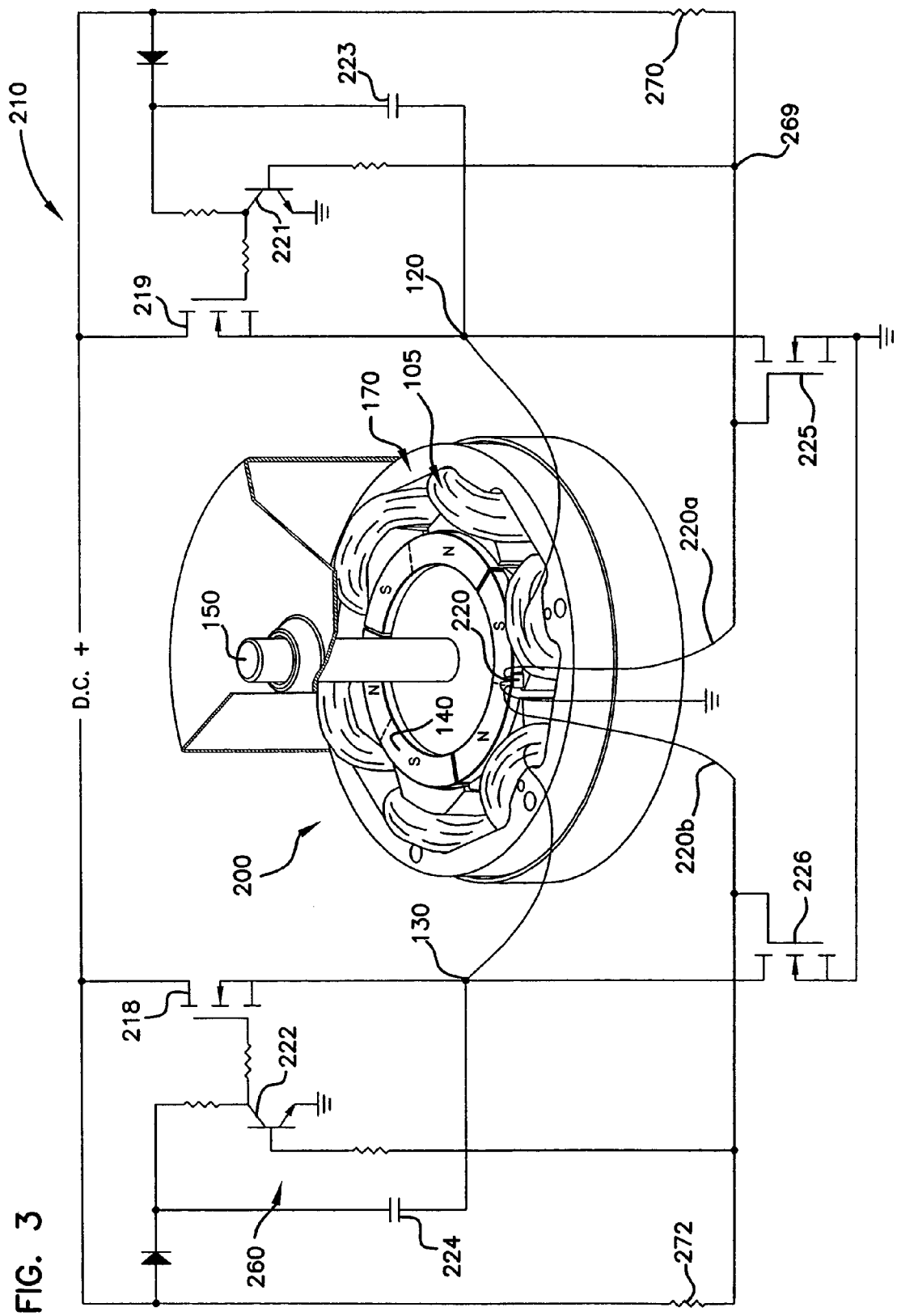
FIG. 3 is a perspective view of another example single coil, direct current permanent magnet brushless motor including a schematic of an example commutation circuit including voltage boost.
Figure 4:
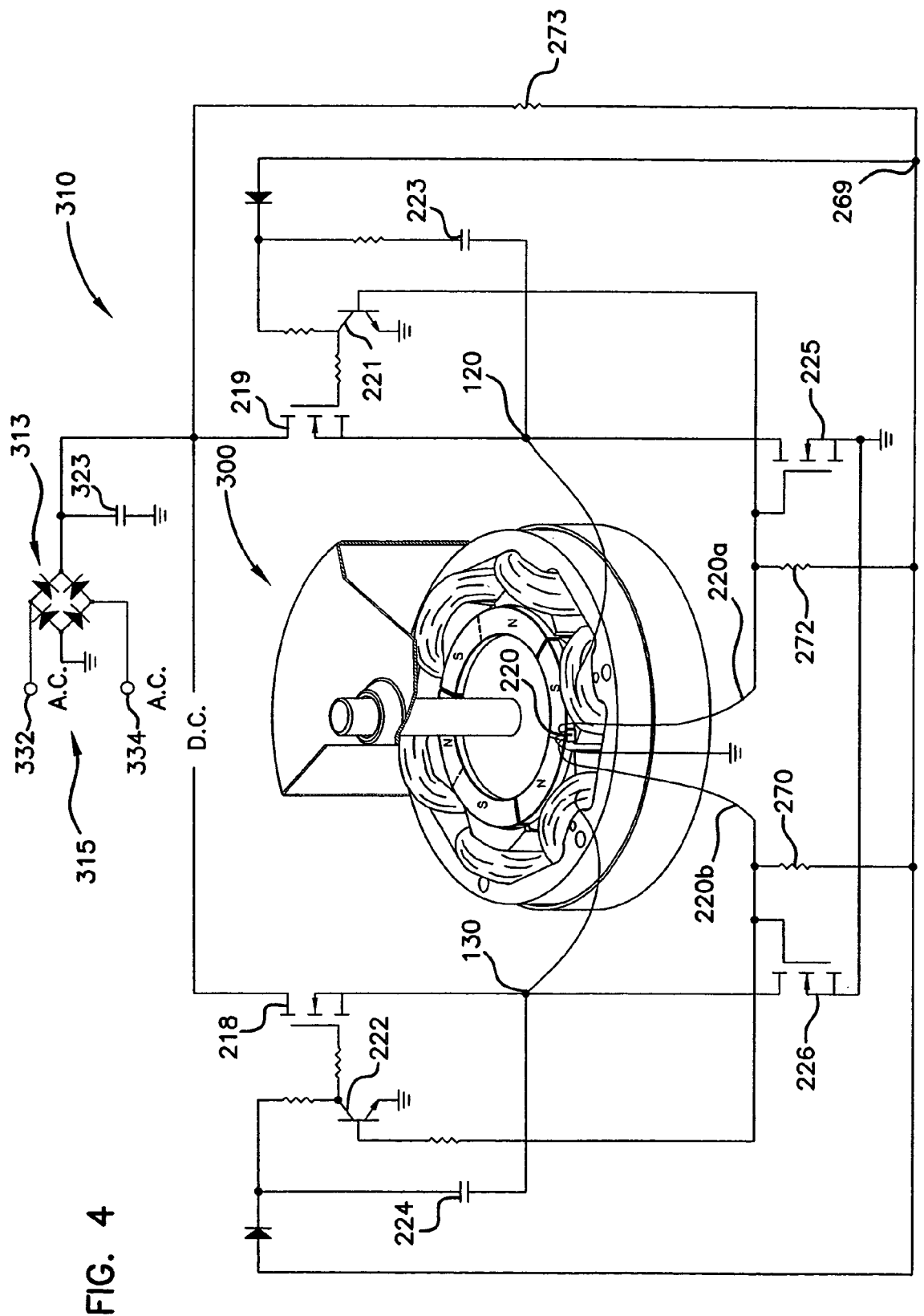
FIG. 4 is a perspective view of another example single coil, direct current permanent magnet brushless motor including a schematic of an example commutation circuit and an alternating current conversion circuit.

Referring now to FIGS. 3 and 4, example single coil, direct current permanent magnet brushless motors 200 and 300 are shown including example drive circuits 210 and 310. The motor 200 shown in FIG. 3 is powered using a direct current (DC) source, while the motor 300 shown in FIG. 4 is powered using an alternating current (AC) source. The drive circuits 210 and 310 can commutate current through the single coil 105 to cause the motors 200 and 300 to spin, as described above.

Referring to FIG. 3, the drive circuit 210 includes semiconductor switches 218, 219, 225 and 226. In a preferred embodiment, N-channel mosfets with a 60 to 600 volt rating and about 35 nanosecond switching are used. However, other semiconductor switches such as other mosfets (e.g., P-channel or PNP), SCRs, Triacs, or other transistors, for example, can also be used.

The circuit 210 also includes inverters 221 and 222 and capacitors 223 and 224, described further below.

The switches 218 and 219 function as high-side switches, and the switches 225 and 226 function as low-side switches. The drains of the two high-side switches 218 and 219 are connected to the bus voltage, while the sources of the two low-side switches 225 and 226 are connected to ground. The source of the high-side switch 218 and the drain of the low-side switch 226 are connected to the second end 130 of the single coil 105, while the source of the high-side switch 219 and the drain of the low-side switch 225 are connected to the first end 120 of the single coil 105.

The drive circuit 210 drives the motor 200 as follows. Generally, the driver circuit 210 switches the direction of the current flowing through the single coil 105. When high-side switch 218 and opposite low-side switch 225 are turned on, current flows in a first or "forward" direction through the coil 105. When switches 218 and 225 are turned off, and high-side switch 219 and low-side switch 226 are turned on, current flows in a second or "reverse" direction through the coil 105. As noted above, alternating the direction of the flow of current through the coil 105 causes the rotor 160 to spin, and torque is thereby transferred to the shaft 150.

To initiate the change in the state of the switches, a sensor 220 is used to measure the angular position of the rotor poles 110 with respect to the stator poles 120. In a preferred embodiment, a single sensor is used, regardless of the number of poles in the motor. Also preferred is a dual output Hall sensor that is mounted to the stator 170 adjacent the rotor 160. As the rotor 160 spins, the sensor 220 measures the change in polarity as oppositely-magnetized rotor poles 140 pass by the sensor. As the rotor pole 140 (and its associated polarity) positioned in front of the sensor 220 changes, the sensor 220 measures the change and provides the commutating signal in order to change the direction of the current flowing through the coil 105.

In alternative embodiments, sensors other than a dual output Hall sensor can be used. For example, a single output Hall sensor can be used, as well as an optical sensor. In addition, multiple sensors can be provided. The sensors can also perform functions other than measuring the angular position of the rotor such as, for example, measuring when the rotor has stopped spinning to provide locked rotor protection, as described further below.

More specifically, the circuit 210 can be used to commutate the current flowing through the coil 105 as follows. When an output 220*a* of the sensor 220 is positive, an output 220*b* is always the opposite of output 220*a* (i.e. negative). When the polarity of the magnet positioned in front of the sensor 220 causes the sensor 220 to provide a positive signal on output 220*a*, the switch 225 is immediately turned on. The same signal from the output 220*a* of the sensor 220 is also provided at the inverter 221, which inverts the signal, providing a negative signal to the switch 219, turning it off. The output 220*b* of the sensor 220 is opposite of that of 220*a*, therefore turning off switch 226 while turning on switch 218. The result is that direct current flows through switches 218 and 225 to ground, thereby producing a torque in the coil that swings in an opposite polarity to that of the magnet in front of the sensor 220. The torque is transferred to the rotor, causing the rotor to spin, and thereby causing the sensor 220 to transition to a second state as another magnet of opposite polarity swings into position in front of the sensor. This causes the sensor to change the outputs 220*a* and 220*b*, thereby turning switches 218 and 225 off and 219 and 226 on, causing the direct current to flow in the opposite direction through the coil.

The high-side switch 218 requires a gate voltage higher than its source voltage to turn on. If the voltage at the end of coil 105 that is connected to switch 226 is lower than the voltage at point 269 then capacitor 224 will be charged to the voltage level at 269. When switch 226 and inverter 222 are turned off, capacitor 224 will provide voltage to the gate of high-side switch 218 and switch 218 will turn on. While switch 218 remains on, the voltage on capacitor 224 will be higher than the bus voltage. Accordingly, high-side switch 219 will be turned on with the voltage from capacitor 223 when switch 225 and inverter 221 are off.

The illustrated switching scheme is therefore advantageous in that an unregulated voltage source can be used to charge the voltage boost capacitors. In this "unregulated" configuration, the voltage across the capacitors 223 and 224 remains at a desired value without requiring a voltage regulator or separate isolated voltage source.

In FIG. 3, the voltage at point 269 is the same as the applied DC voltage. In FIG. 4, the voltage at point 269 is produced by a voltage divider. The voltage divider is either resistors 270 or 272 in series with 273. The drive circuit 310 shown in FIG. 4 is similar to drive circuit 210 described above, except for an alternating current conversion circuit 315. The circuit 315 accepts at inputs 332 and 334 current from an AC source. A bridge rectifier 313 (including four diodes) and a smoothing capacitor 323 are used to convert the AC into DC, which powers the remainder of the driver circuit 310. In this manner, an AC source is used to drive the motor 300.

In addition to requiring drive circuits to function, electric motors may require locked rotor protection to increate reliability. This protection can take the form of thermally operated switches or relays that are sufficient to protect induction motors that heat up slowly with the rotor locks up. An electronically driven motor such as a brushless motor uses transistors that heat up rapidly, therefore other methods of sensing rotor lockup may be required.

In the illustrated embodiment, locked rotor protection can be provided by the sensor 220. The preferred Hall sensor is a dual output Hall sensor that is configured to drive two inductive coils, with an added feature to detect a stalled condition. In the illustrated embodiment, the sensor 220 is modified by the addition of two resistors 270 and 272 to supply current to the sensor. When the rotor is locked up or stalled, the sensor 220 detects an absence of magnetic change and this condition is reflected at the resistors 270 and 272, with the sensor shutting off current to all four switches 218, 219, 225, and 226 for a period of time.

In this configuration, locked rotor protection is achieved with minimum parts and at a low cost. Other methods can also be used to provide locked rotor protection, such as by using a sensor resistor and an SCR, with the sensing resistor positioned in the main line to provide a turn-off when current increases rapidly during locked rotor conditions. In such an arrangement, the gate of the SCR is provided with a "hold-off" capacitor and diode to prevent false turn-offs.

A brushless electric motor configured as disclosed herein has several advantages. For example, the preferred six-pole brushless motor disclosed herein includes only two free ends, which can be driven with a drive circuit that is simple in terms of the number of components. For example, only the four transistors formed into a bridge circuit are needed. Other single phase motor designs, including 4, 8, or 10 poles, likewise include only two free ends and are therefore advantageous. In addition, the brushless motors disclosed herein are cost-effective for manufacture, and are as efficient or more efficient than other brushless electric motors, since approximately 100 percent of the copper windings are utilized at a given time. Further, the drive circuits for the motors are robust and can provide efficient locked rotor protection using minimal additional components.

Figure 5:
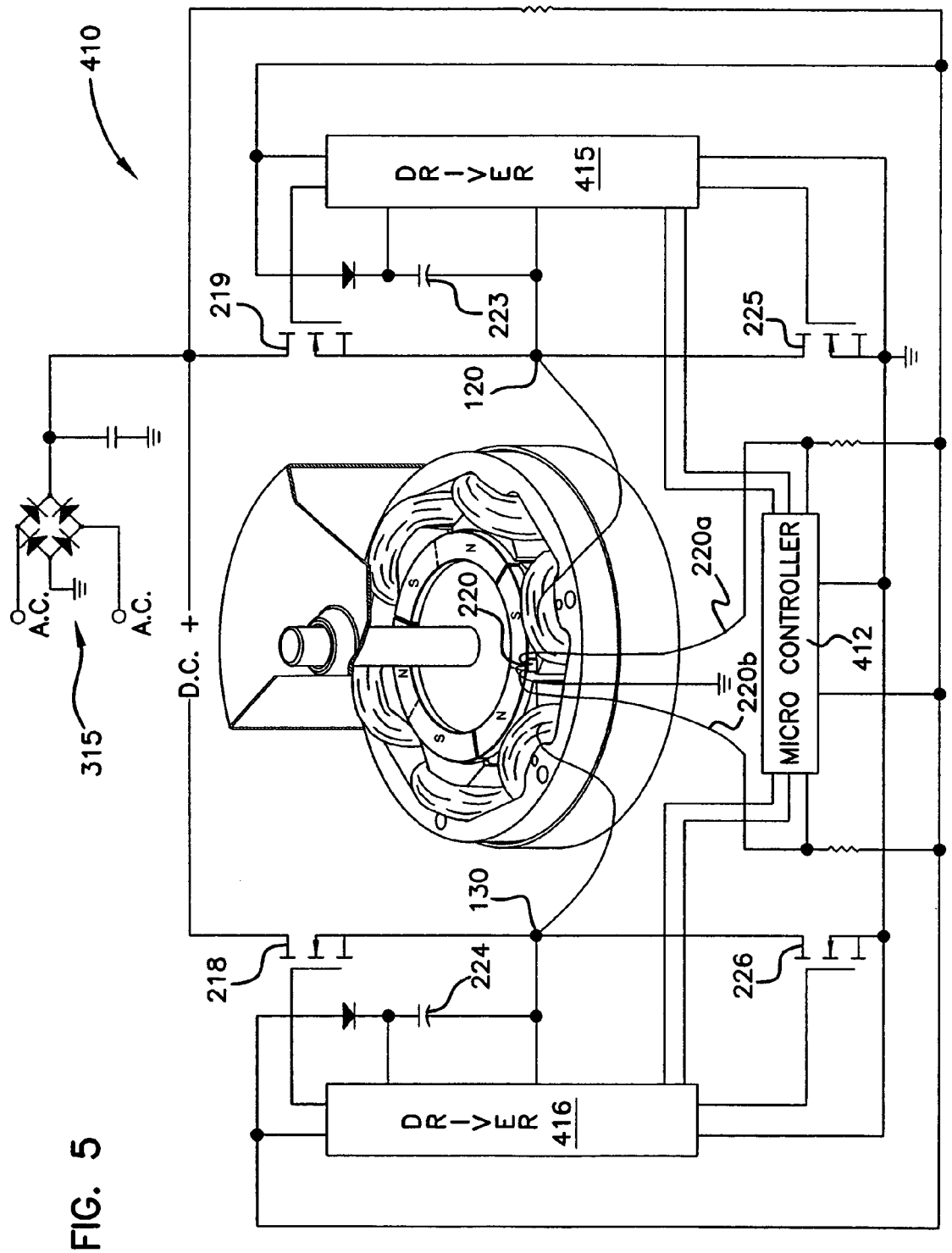
FIG. 5 is a perspective view of another example single coil, direct current permanent magnet brushless motor including a schematic of an example commutation circuit having a microcontroller.

Various modifications can be made to the motor and circuits shown and described herein. For example, as shown in FIG. 5, example circuit 410 includes a microcontroller 412 and drivers 415 and 416 that are coupled to the Hall sensor 220 output and are used to commutate the H-bridge circuit.

In other embodiments, various forms of digital signal processing can be used to enhance commutation of the motor. Other modifications to the motor and circuitry are also possible, such as commutation without a Hall sensor.

The above specification, examples and data provide a complete description of the manufacture and use of various aspects of the invention. Since many embodiments of the invention can be made without departing from the spirit and scope of the invention, the invention resides in the claims hereinafter appended.

What is claimed is:

1. A single coil, direct current permanent magnet brushless motor, comprising:
an internal rotor including at least four alternate poles;
an external stator with a like number of salient poles, each including alternately wound coils coupled to form a single coil;
a commutated H-bridge including a voltage boost circuit having capacitors providing a boosted voltage to alternately turn on high-side switches of the H-bridge, wherein the capacitors are charged by a low-side switching signal flowing through low-side switches; and
a microcontroller to commutate the H-bridge.

2. The motor of claim 1, wherein the rotor further comprises at least four alternate-polarity magnets that form the at least four alternate poles.

3. The motor of claim 1, wherein the capacitors are charged by an unregulated bus voltage.

4. The motor of claim 1, wherein the rotor includes six alternate poles and the stator includes six coils connected into the single coil.

5. The motor of claim 4, wherein the rotor further comprises at least three magnets that form the six alternate poles.

6. The motor of claim 1, wherein the H-bridge further includes an alternating current conversion circuit including a bridge rectifier and smoothing capacitor coupled to a source of alternating current, the conversion circuit converting the alternating current to provide direct current to power the motor.

7. The motor of claim 1, wherein the motor is configured to be powered by either alternating current or direct current.

8. The motor of claim 1, wherein a uniform concentric air gap is defined between the stator and the rotor.

9. The motor of claim 1, further comprising a module configured to provide locked rotor protection.

10. A method of commutating a single coil, direct current permanent magnet brushless motor including a rotor with at least four poles, a stator with a like number of salient poles each having alternately wound coils coupled to form a single coil with two free ends, a commutated H-bridge including a voltage boost circuit having capacitors providing a boosted voltage, and a microcontroller, the method comprising:
charging the capacitors by a switching current flowing through low-side switches of the H-bridge;
controlling the high-side switches of the H-bridge using an inverted low-side switching signal from the low-side switches of the H-bridge;
turning on the high-side switches of the H-bridge using the charge stored in the capacitors; and
controlling commutation of the H-bridge using the microcontroller.

11. The method of claim 10, further comprising forming the at least four poles of the rotor using at least four alternate-polarity magnets.

12. The method of claim 10, wherein the rotor includes six alternate poles.

13. The method of claim 12, further comprising forming the six alternate poles using at least three magnets.

* * * * *